United States Patent
Wolczko et al.

(10) Patent No.: US 7,376,683 B1
(45) Date of Patent: *May 20, 2008

(54) FAST LIFETIME ANALYSIS OF OBJECTS IN A GARBAGE COLLECTED SYSTEM

(75) Inventors: Mario Wolczko, San Carlos, CA (US); Antonio Cunei, Glasgow (IT)

(73) Assignee: Sun Microsystems, Inc., Santa Clara, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/796,539

(22) Filed: Mar. 8, 2004

Related U.S. Application Data

(63) Continuation of application No. 10/116,236, filed on Apr. 3, 2002, now Pat. No. 6,728,738.

(51) Int. Cl.
  *G06F 17/30* (2006.01)
  *G06F 12/00* (2006.01)
(52) U.S. Cl. ..................... 707/206; 707/200
(58) Field of Classification Search ............ 707/205, 707/206, 200
See application file for complete search history.

(56) References Cited

U.S. PATENT DOCUMENTS

| | | | | |
|---|---|---|---|---|
| 5,241,673 A * | 8/1993 | Schelvis | ............... | 707/103 R |
| 5,446,901 A | 8/1995 | Owicki et al. | | |
| 6,446,257 B1 * | 9/2002 | Pradhan et al. | ............ | 717/154 |
| 6,523,059 B1 * | 2/2003 | Schmidt | ............ | 718/100 |
| 7,174,354 B2 * | 2/2007 | Andreasson | ............ | 707/206 |
| 2001/0044856 A1 * | 11/2001 | Agesen et al. | ............ | 709/315 |
| 2002/0178437 A1 * | 11/2002 | Blais et al. | ............ | 717/140 |

OTHER PUBLICATIONS

Hertz, M., et al. "Error-Free Garbage Collection Traces: How to Cheat and Not Get Caught", Department of Computer Science, University of Massachusetts, Amherst, MA 01003 {hertz,steveb,moss}@cs.umass.edu, 14 pages.

* cited by examiner

*Primary Examiner*—Wilson Lee
*Assistant Examiner*—Thanh-Ha Dang
(74) *Attorney, Agent, or Firm*—Gunnison, McKay & Hodgson, L.L.P.; Philip J. McKay

(57) ABSTRACT

The analysis of the lifetime of objects in a garbage-collected system may be accomplished quickly and effectively using reference counts and cyclic garbage analysis. A reference count is maintained for each of the objects to indicate the number of incoming pointers. Each time the graph structure is altered, the reference counts are updated. Timestamps are recorded each time the reference count for objects change. If a reference count goes to zero, the corresponding object may be indicated as dead. A garbage collection need only be run once (perhaps at the end), and after it is run the system may indicate which objects are cyclic garbage. The timestamps for objects which are cyclic garbage are then reviewed in reverse chronological order. For each timestamp found, the corresponding object and any object reachable from the corresponding object are indicated as dead. These objects are then removed from the set of cyclic garbage.

36 Claims, 8 Drawing Sheets

FAST LIFETIME ANALYSIS OF OBJECTS IN A GARBAGE COLLECTED SYSTEM

CROSS-REFERENCE TO RELATED APPLICATION

This application is a continuation of U.S. patent application Ser. No. 10/116,236, entitled "Fast Lifetime Analysis Of Objects In A Garbage Collected System" by Mario Wolczko and Antonio Cunei, filed on Apr. 3, 2002 now U.S. Pat. No. 6,728,738.

The present invention relates to the field of computer science. More particularly, the present invention relates to determining the lifetime of objects in a garbage-collected system.

BACKGROUND OF THE INVENTION

In computer science, garbage collection refers to the recovery of pooled computer storage that is being used by a program when that program no longer needs the storage. The garbage collection routine searches memory for data that are no longer active in order to reclaim the space. This frees the storage for use by other programs (or processes within a program). It also ensures that a program using increasing amounts of pooled storage does not reach a quota.

Garbage collection routines are typically encoded when a program is created. In some cases, the routines may even be embedded into hardware or flash memory. Thus, it is increasingly important to verify that the most efficient and accurate garbage collection routines are found before they are implemented, as modification after implementation may be difficult or impossible. Since different programs have different optimal garbage collection routines, it is important to test garbage collection techniques on specific programs before implementation.

Performance analysis of the garbage collection technique during creation or fine-tuning allows the developer to test the efficiency and accuracy of the technique. Typically, the lifetime of the objects is measured by forcing a complete garbage collection after each mutation of the object graph. FIG. 1 is a diagram illustrating an example of an object graph. Roots 100, 102 may point to objects 104, 106. Each time the object graph changes, there is the potential that one or more of the objects may "die". An object is considered dead if it is no longer reachable from a root. Forcing a garbage collection after each mutation fully updates the system, thus information on when an object dies can easily be recorded.

Additionally, it is often useful to have precise lifetime information in order to analyze the program itself, such as by providing a histogram of the lifetimes of various objects within the program.

However, measuring the lifetime of each object in this manner is fairly processor-intensive. The time it takes to run a garbage collection grows in proportion to the size of the object graph. In order to avoid this overhead, it is typical to only force a garbage collection periodically, for example after every thousand mutations. However, there is significant loss in precision in the lifetime analysis when this periodic measurement is undertaken.

What is needed is a solution for effectively and efficiently computing precise object lifetimes.

BRIEF DESCRIPTION OF THE INVENTION

The analysis of the lifetime of objects in a garbage-collected system may be accomplished quickly and effectively using reference counts and cyclic garbage analysis. A reference count is maintained for each of the objects to indicate the number of incoming pointers. Each time the graph structure is altered, the reference counts are updated. Timestamps are recorded each time the reference count for objects change. If a reference count goes to zero, the corresponding object may be indicated as dead. A garbage collection need only be run once (perhaps at the end), and after it is run the system may indicate which objects are cyclic garbage. The timestamps for objects which are cyclic garbage are then reviewed in reverse chronological order. For each timestamp found, the corresponding object and any object reachable from the corresponding object are indicated as dead. These objects are then removed from the set of cyclic garbage.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
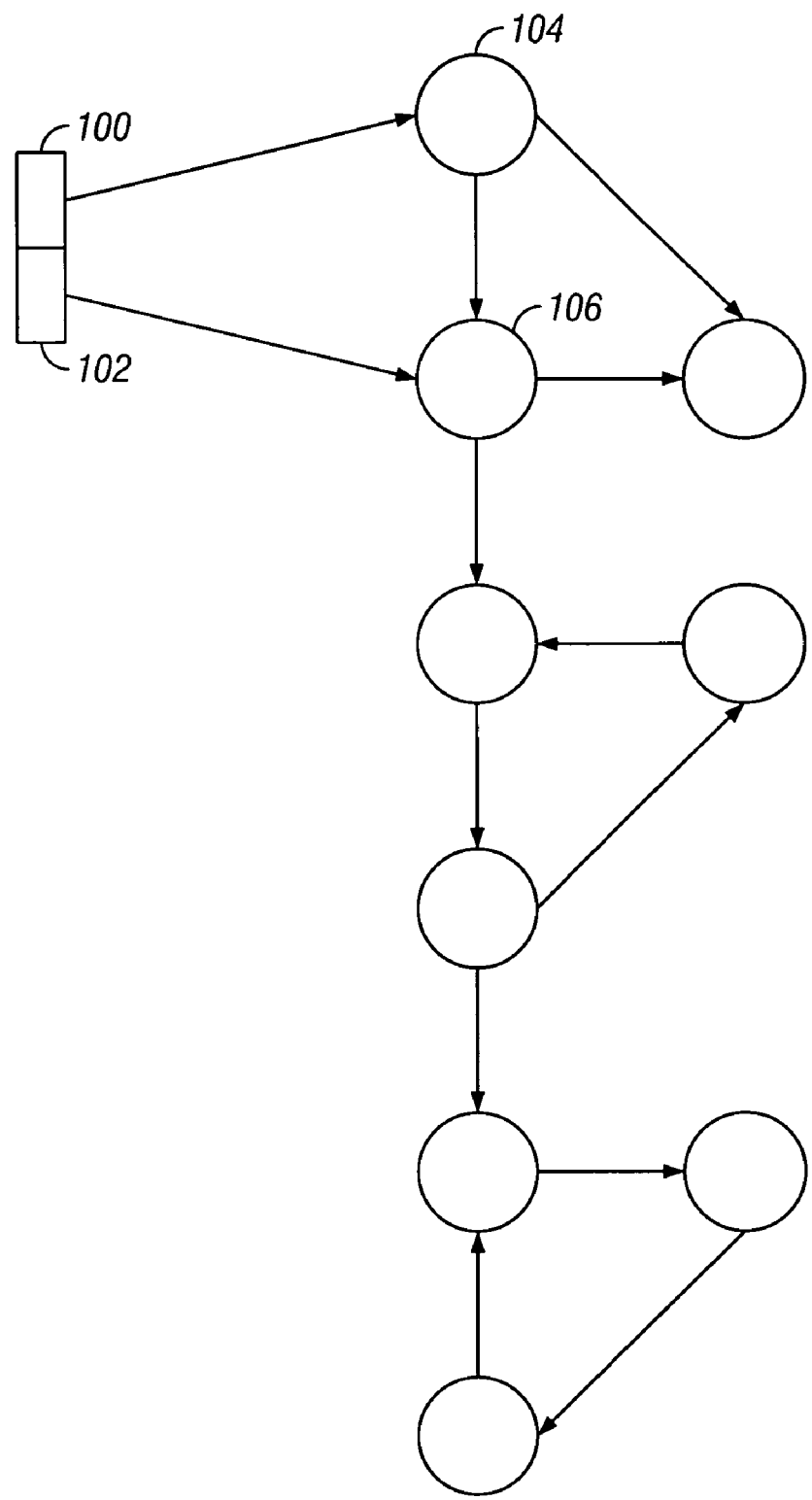
FIG. 1 is a diagram illustrating an example of an object graph.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A specific embodiment of the present invention may be executed using a Java™ Virtual Machine created by Sun Microsystems, Inc. of Palo Alto, Calif. However, one of ordinary skill in the art will recognize that the present invention may be implemented using a variety of different systems and need not be limited to specific examples provided in this document.

In a specific embodiment of the present invention, a solution is provided wherein time stamps of mutations are tracked. When a garbage collection is run, the system may then backtrack to determine when it was that certain objects became garbage. This provides extremely accurate lifetime measurements for use in garbage collection technique analysis. It also significantly reduces processor time as the garbage collection need only be run once (at the end).

It should be noted that while only one garbage collection needs to be run, implementations are possible where multiple garbage collections are run. Additionally, it should be noted that while in a specific embodiment of the present invention, the lifetime analysis is only performed after all of the garbage collections have been run, embodiments are possible where the lifetime analysis is performed after each individual garbage collection.

Figure 2:
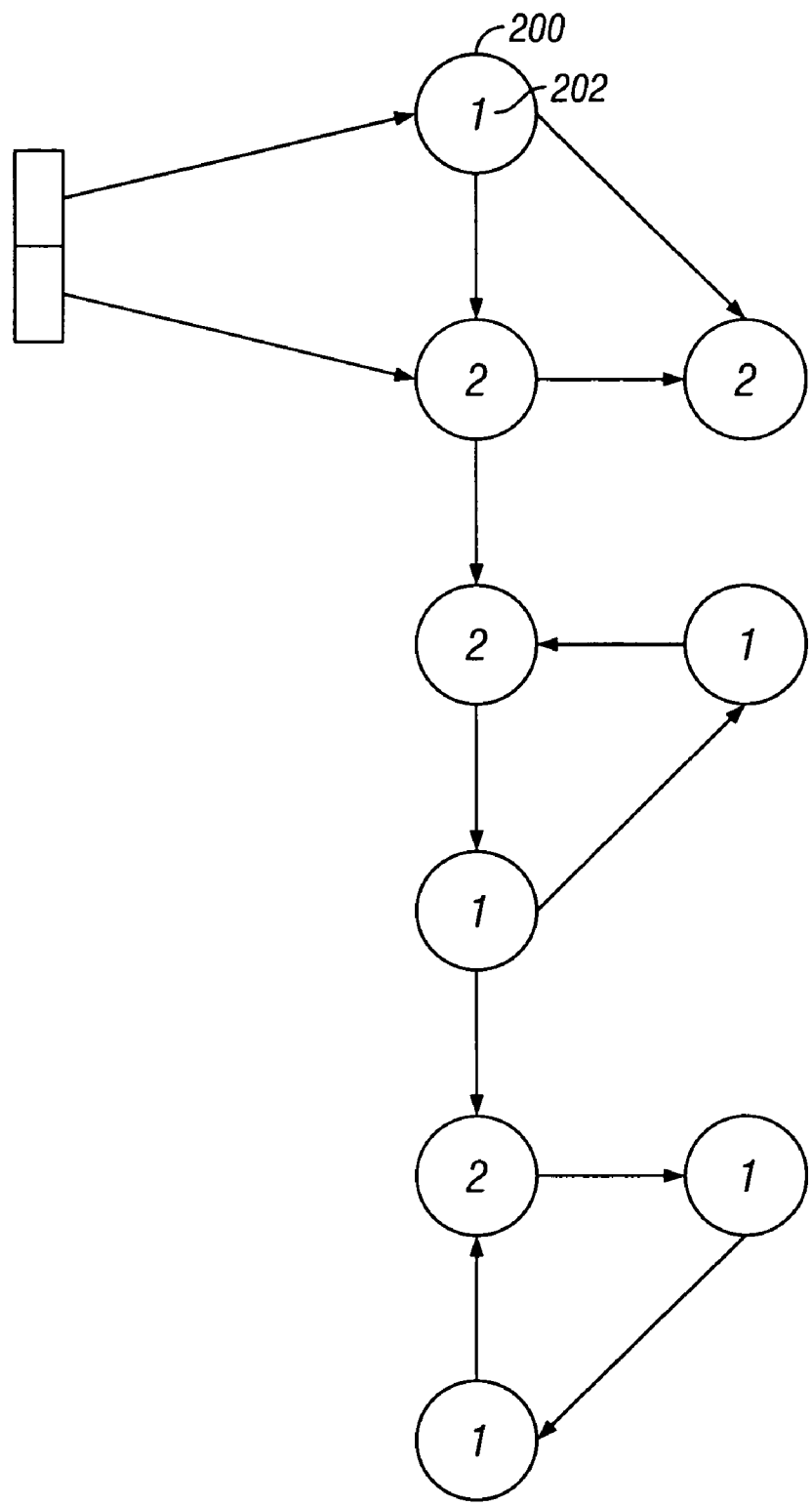
FIG. 2 is a block diagram illustrating an object graph having reference counts in accordance with a specific embodiment of the present invention.

In a specific embodiment of the present invention, reference counts are maintained for each object in the object graph. Reference counts are values stored that indicate the number of incoming pointers to an object. Reference counts are modified as the graph is modified, and when a reference count goes to zero, it is clear the object is unreachable from the root (as it is unreachable from any node). FIG. 2 is a block diagram illustrating an object graph having reference counts in accordance with a specific embodiment of the present invention. Each object 200 has a stored reference count 202. When one of the links is modified and removed, the reference count of the object to which it was pointing is decremented. If a reference count equals zero, it means that it has no incoming pointers and thus is dead.

Figure 3:
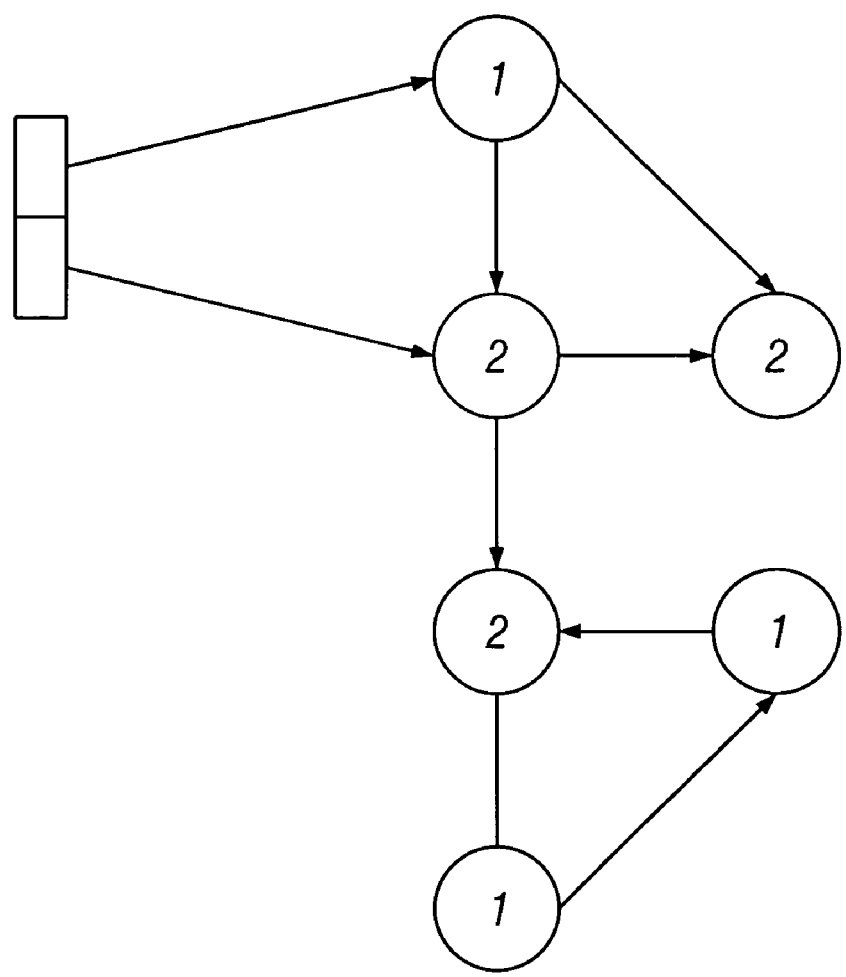
FIG. 3 is a block diagram illustrating a dead cycle
Figure 3:
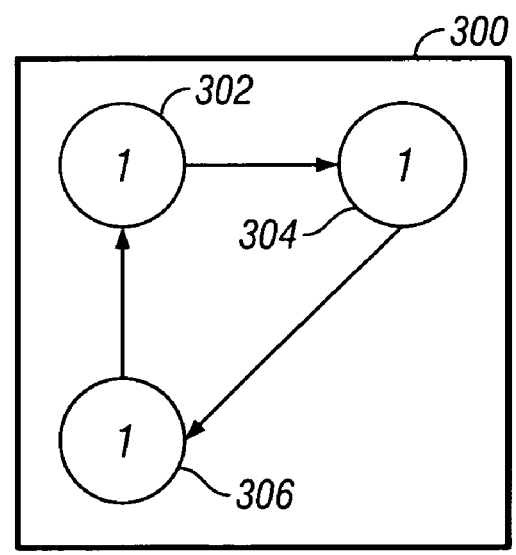

However, reference counting alone does not always ensure accurate lifetime analysis. This is because reference counting has trouble identifying dead cycles. A dead cycle is one in which each object points to another object in the cycle, but no incoming links enter the cycle itself. FIG. 3 is a block diagram illustrating a dead cycle. This diagram is identical to FIG. 2, except the incoming link to cycle 300 has been removed and the corresponding reference count of 302 has changed accordingly. However, none of the reference counts for 302, 304, or 306 are equal to zero. Therefore, reference counting alone would not recognize that 302, 304, and 306 are garbage.

In a specific embodiment of the present invention reference counting is utilized to determine when normal objects die. However, in the special case of objects which are part of cycles, a specialized technique is used wherein the timestamps of changes to the cycles are examined in reverse chronological order in order to determine when objects within a cycle die. This is most efficiently accomplished at the time of a garbage collection. Therefore, as a graph structure changes, timestamps record the changes and reference counting may be used to tell when objects die. Then, when a garbage collection is run, the timestamps corresponding to the remaining objects still listed as alive are examined and an object is listed as dead if its reference count is zero or it is cyclic garbage. After garbage collection is run, the system may then go back through the objects listed as dead and label any object with a reference number higher than zero as cyclic garbage. One of ordinary skill in the art will recognize, however, that the garbage collection and the cyclic garbage labeling could be combined into a single step.

The timestamps are then examined in reverse chronological order, thus the last change to an object within the cycle will be encountered first. The timestamp of the last change to an object within a cycle is deemed to be the timestamp at which all objects in the cycle died. Therefore, all objects in that cycle are listed as dead as of that time, and then all the timestamps corresponding to objects in that cycle are removed from the list of remaining timestamps to be examined. Eventually, all the cycles will have been examined and a precise timestamp of when each dies will have been indicated. This ensures that both cyclic and non-cyclic garbage have accurate lifetime calculations.

Figure 4:
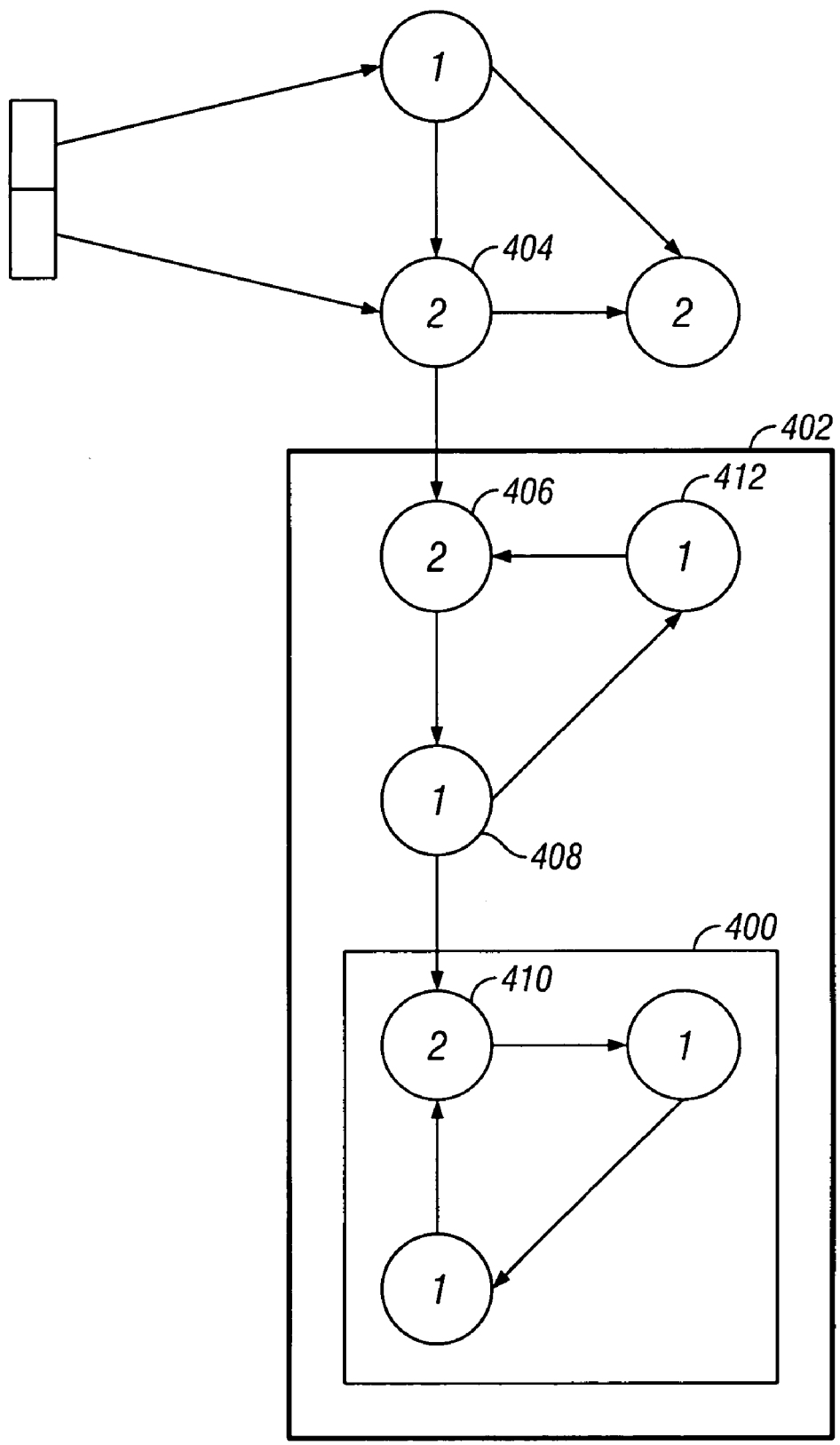
FIG. 4 is a diagram illustrating a graph structure having a cycle within another cycle.

The reason for removing all objects listed as dead from the list of objects which are garbage is so that the lifetimes are accurately computed for all objects within the cycle as well as to handle cases where cycles may be contained within other cycles. FIG. 4 is a diagram illustrating a graph structure having a cycle within another cycle. This figure has the cycles identified. Cycle 400 may be contained within larger cycle 402. If the link from 404 to 406 is removed, suddenly entire cycle 402 is dead. However, if just the link from 408 to 410 is removed, only cycle 400 is dead, and objects 406, 408, and 412 are still alive and remain in cycle 402.

Figure 5:
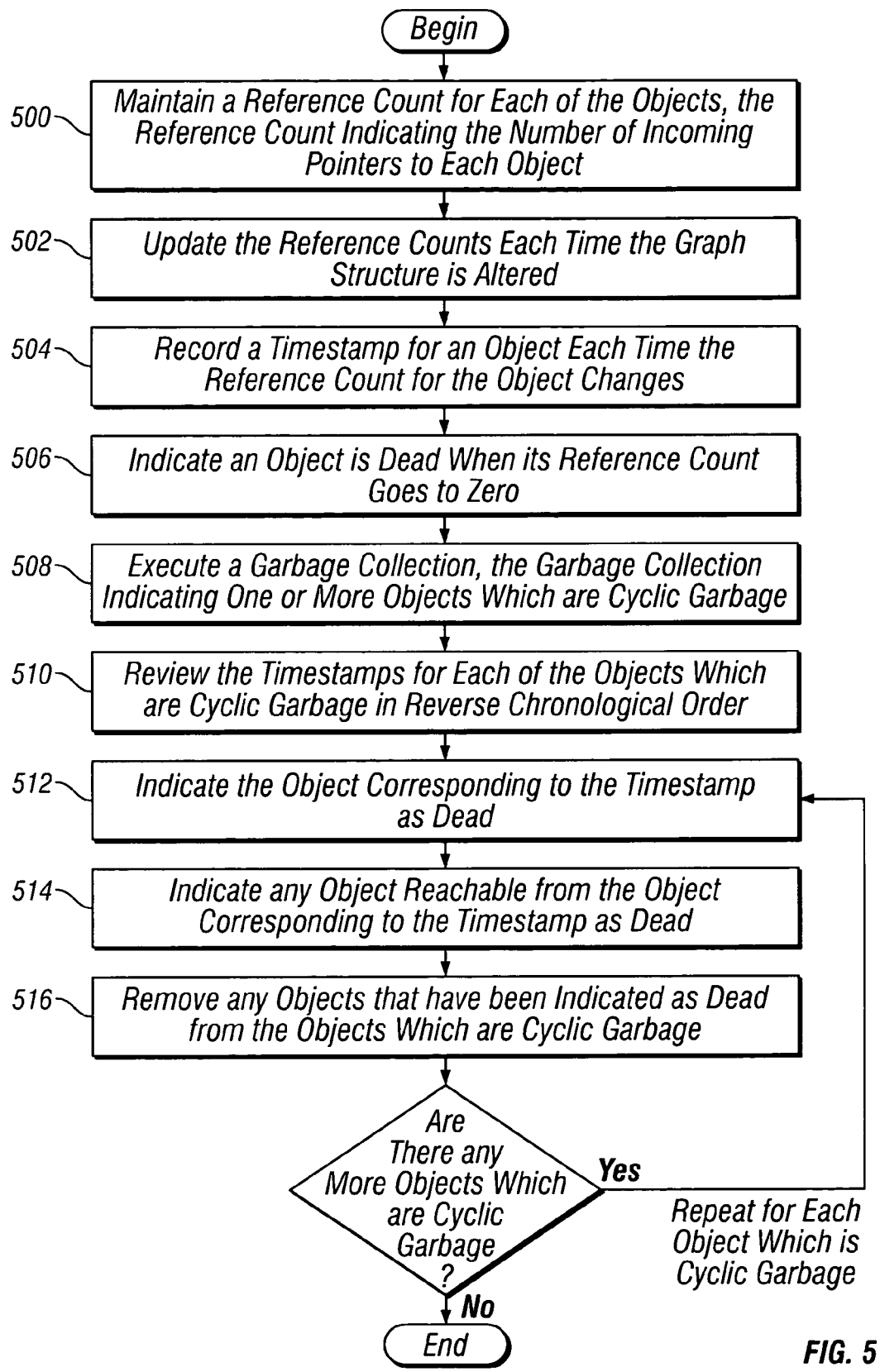
FIG. 5 is a flow diagram illustrating a method for measuring the lifetime of objects in a garbage-collected system, the objects organized in a graph structure, in accordance with a specific embodiment of the present invention.

FIG. 5 is a flow diagram illustrating a method for measuring the lifetime of objects in a garbage-collected system, the objects organized in a graph structure, in accordance with a specific embodiment of the present invention. At 500, a reference count is maintained for each of the objects, the reference count indicating the number of incoming pointers to each object. At 502, the reference counts are updated each time the graph structure is altered. At 504, a timestamp is recorded for an object each time the reference count for the object changes. The timestamp may be a counter that is incremented on every pointer store. It may be stored in a record generated each time a change is made to the graph structure. At 506, an object is indicated as dead when its reference count goes to zero. At 508, a garbage collection is executed, the garbage collection indicating one or more objects which are cyclic garbage. A tracing collector may be utilized to detect when objects are cyclic garbage. Specifically, a mark-sweep collector may be used. Then, at 510 the timestamps for each of the objects which are cyclic garbage are reviewed in reverse chronological order. For each timestamp found, 512-516 are executed. At 512, the object corresponding to the timestamp is indicated as dead. At 514, any object reachable from the object corresponding to the timestamp is also indicated as dead. Then, at 516, any objects that have been indicated as dead are removed from the objects which are cyclic garbage. The lifetime of the object may then be the period between the time it is created and the time it dies, the time it dies being measured by when its corresponding reference count goes to zero or the time it was indicated the object was dead. The reviewing may be repeated each time a garbage collection is executed.

Figure 6:
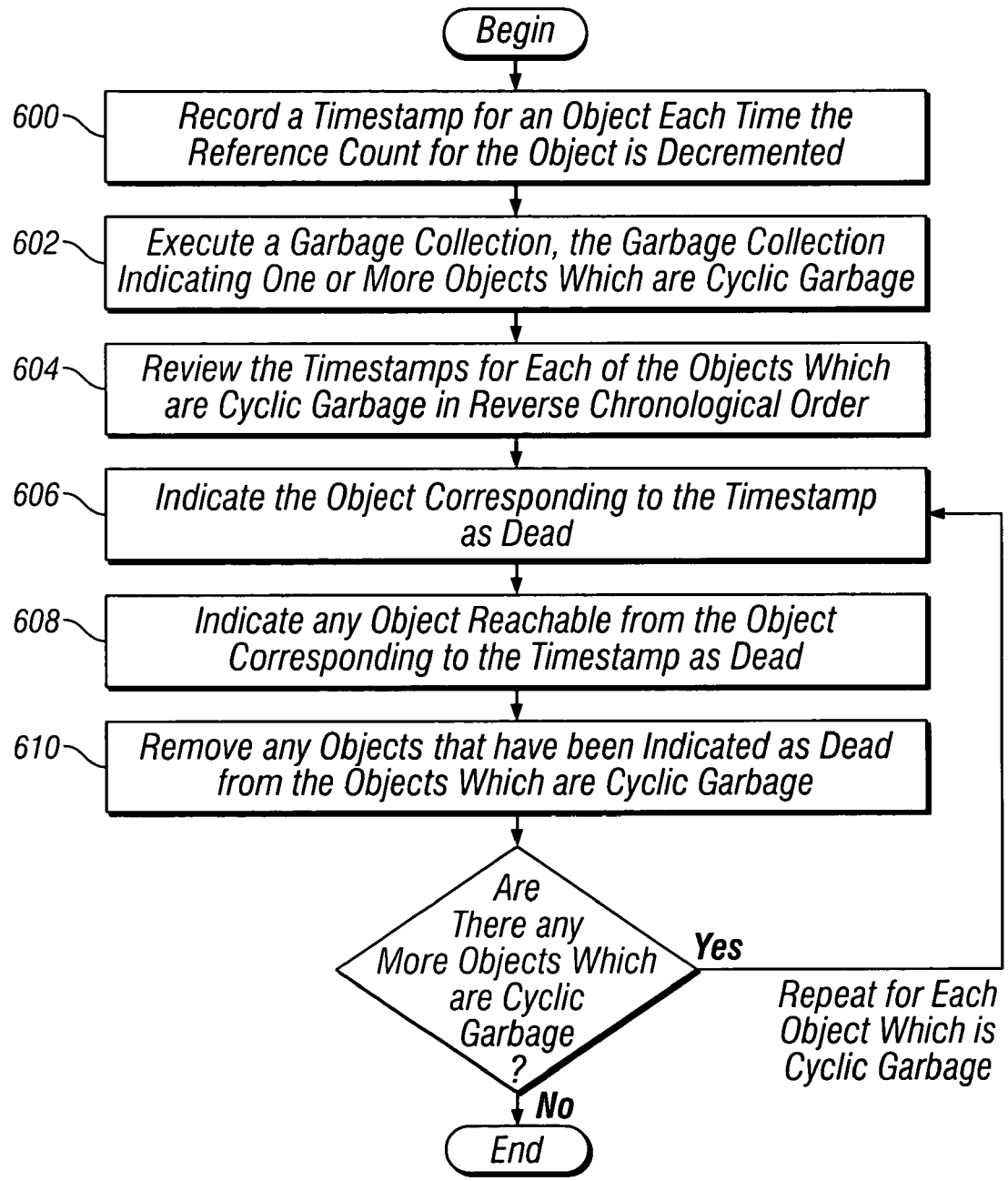
FIG. 6 is a flow diagram illustrating a method for measuring the lifetime of objects in a garbage-collected system, the objects organized in a graph structure, in accordance with a specific embodiment of the present invention.

FIG. 6 is a flow diagram illustrating a method for measuring the lifetime of objects in a garbage-collected system, the objects organized in a graph structure, in accordance with a specific embodiment of the present invention. In this embodiment, the reference counts are only examined when the garbage collection is executed. Thus, it is not necessary for a reference count to be maintained for each object. Only reference count decrements need to be recorded, and the timestamps are adequate to convey that information. Thus, at 600, a timestamp is recorded for an object each time the reference count for the object is decremented. The timestamp may be a counter that is incremented on every pointer deletion. It may be stored in a record generated each time a change is made to the graph structure. At 602, a garbage collection is executed, the garbage collection indicating one or more objects which are cyclic garbage. A tracing collector may be utilized to detect when objects are cyclic garbage. Specifically, a mark-sweep collector may be used. Then, at 604 the timestamps for each of the objects which are cyclic garbage are reviewed in reverse chronological order. For each timestamp found, at 606, the object corresponding to the timestamp is indicated as dead. At 608, any object reachable from the object corresponding to the timestamp is also indicated as dead. Then, at 610, any objects that have been indicated as dead are removed from the objects which are cyclic garbage. The lifetime of the object may then be the period between the time it is created and the time it dies, the time it dies being measured by the time it was indicated the object was dead. The reviewing may be repeated each time a garbage collection is executed.

Figure 7:
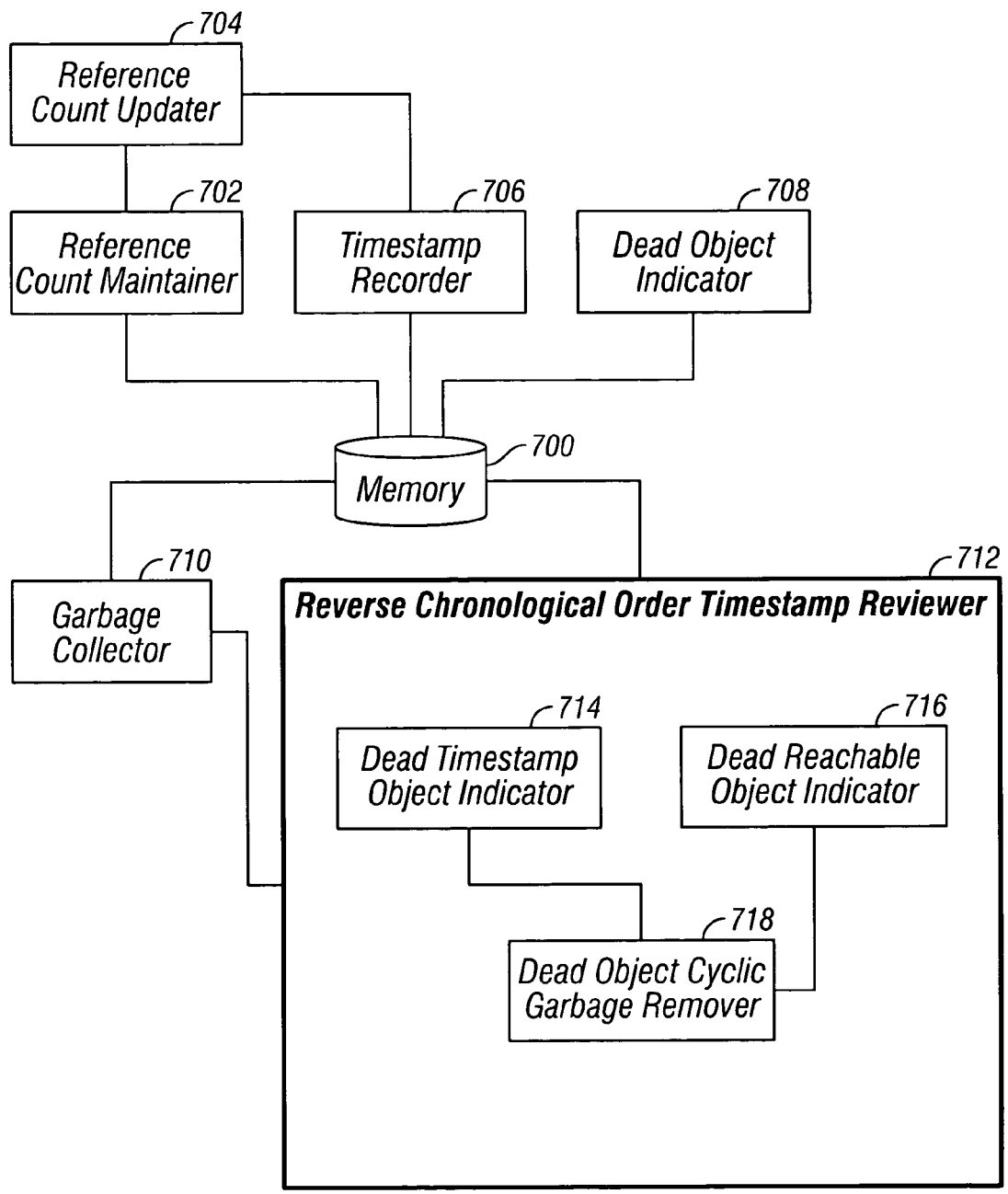
FIG. 7 is a block diagram illustrating an apparatus for measuring the lifetime of objects in a garbage-collected system, the objects organized in a graph structure, in accordance with a specific embodiment of the present invention.

FIG. 7 is a block diagram illustrating an apparatus for measuring the lifetime of objects in a garbage-collected system, the objects organized in a graph structure, in accordance with a specific embodiment of the present invention. A memory 700 may be used to store the objects and other data structures. A reference count maintainer 702 coupled to the memory 700 maintains a reference count for each of the objects, the reference count indicating the number of incoming pointers to each object. A reference count updater 704 coupled to the reference count maintainer 702 updates the reference counts each time the graph structure is altered. A timestamp recorder 706 coupled to the memory 700 and to the reference count updater 704 records a timestamp for an object each time the reference count for the object changes. The timestamp may be a counter that is incremented on every pointer store. It may be stored in a record generated each time a change is made to the graph structure. A dead object indicator 708 coupled to the reference count updater 704 and to the memory 700 indicates an object as dead when its reference count goes to zero. A garbage collector 710 coupled to the memory 700 executes a garbage collection, the garbage collection indicating one or more objects which are cyclic garbage. A tracing collector may be utilized to detect when objects are cyclic garbage. Specifically, a mark-sweep collector may be used. A reverse chronological order timestamp reviewer 712 coupled to garbage collector 710 reviews the timestamps for each of the objects which are cyclic garbage in reverse chronological order. For each timestamp found, the reverse chronological order timestamp reviewer 712 executes several actions with subcomponents. The reverse chronological order timestamp reviewer 712 has a dead object timestamp indicator 714, which indicates that the object corresponding to the timestamp is dead. A dead reachable object indicator 716 indicates any object reachable from the object corresponding to the timestamp is dead. A dead object cyclic garbage remover 718 coupled to the dead timestamp object indicator 714 and the dead reachable object indicator 716 removes any objects that have been indicated as dead from the objects which are cyclic garbage. The lifetime of the object may then be the period between the time it is created and the time it dies, the time it dies being measured by when its corresponding reference count goes to zero or the time it was indicated the object was dead. The reviewing may be repeated each time a garbage collection is executed.

Figure 8:
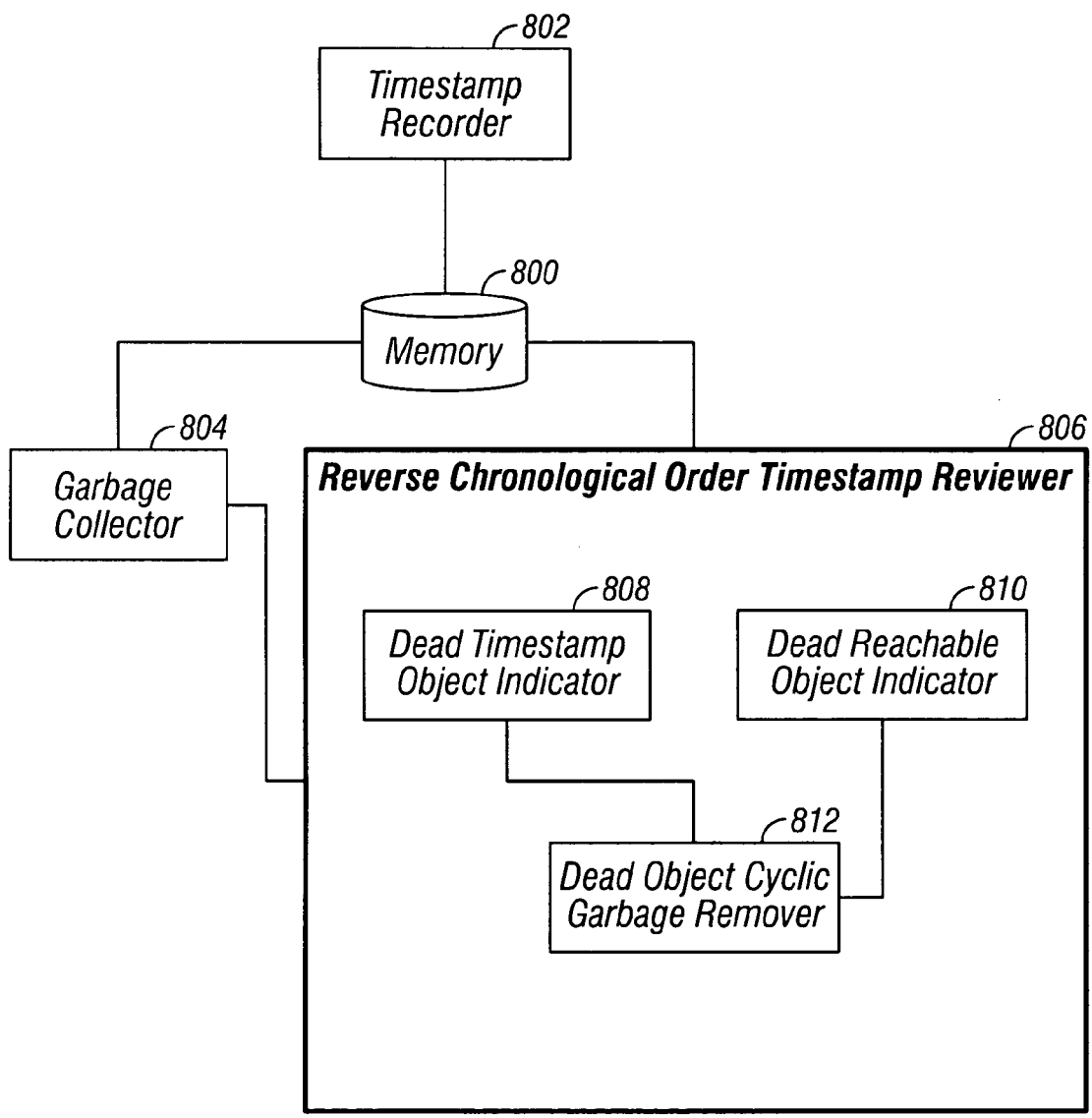
FIG. 8 is a block diagram illustrating an apparatus for measuring the lifetime of objects in a garbage-collected system, the objects organized in a graph structure, in accordance with a specific embodiment of the present invention.

FIG. 8 is a block diagram illustrating an apparatus for measuring the lifetime of objects in a garbage-collected system, the objects organized in a graph structure, in accordance with a specific embodiment of the present invention. In this embodiment, the reference counts are only examined when the garbage collection is executed. Thus, it is not necessary for a reference count to be maintained for each object. A memory 800 may be used to store the objects and other data structures. A timestamp recorder 802 coupled to the memory 800 records a timestamp for an object each time the reference count for the object is decremented. The timestamp may be a counter that is incremented on every pointer deletion. It may be stored in a record generated each time a change is made to the graph structure. A garbage collector 804 coupled to the memory 800 executes a garbage collection, the garbage collection indicating one or more objects which are cyclic garbage. A tracing collector may be utilized to detect when objects are cyclic garbage. Specifically, a mark-sweep collector may be used. A reverse chronological order timestamp reviewer 806 coupled to garbage collector 804 reviews the timestamps for each of the objects which are cyclic garbage in reverse chronological order. For each timestamp found, the reverse chronological order timestamp reviewer 808 executes several actions with subcomponents. A dead object timestamp indicator 810 indicates that the object corresponding to the timestamp is dead. A dead reachable object indicator 812 indicates any object reachable from the object corresponding to the timestamp is dead. A dead object cyclic garbage remover 814 coupled to the dead timestamp object indicator 810 and the dead reachable object indicator 812 removes any objects that have been indicated as dead from the objects which are cyclic garbage. The lifetime of the object may then be the period between the time it is created and the time it dies, the time it dies being measured by when its corresponding reference count goes to zero or the time it was indicated the object was dead. The reviewing may be repeated each time a garbage collection is executed.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for measuring the lifetime of objects in a garbage-collected system, the objects organized in a graph structure, the method including:
    maintaining a reference count for one or more of the objects, said reference count indicating the number of incoming pointers to each object;
    recording a timestamp for an object when said reference count for said object changes;
    reviewing in reverse chronological order said timestamps for each of said objects which are cyclic garbage, and for each timestamp found:
        indicating that the object corresponding to said timestamp is dead; and
        indicating that any object reachable from said object corresponding to said timestamp is dead.

2. The method of claim 1, further including executing a garbage collection, said garbage collection indicating one or more objects which are cyclic garbage.

3. The method of claim 2, wherein said executing includes detecting objects which are cyclic garbage by invoking a tracing collector.

4. The method of claim 3, wherein said tracing collector is a mark-sweep collector.

5. The method of claim 1, wherein said timestamp is a counter which is incremented on a pointer store.

6. The method of claim 1, wherein the lifetime of an object is the period between the time it is created and the time it dies.

7. The method of claim 6, wherein the time an object dies can be traced to the timestamp of when it was indicated the object was dead.

8. The method of claim 1, wherein each time a change is made to the graph structure, a record is generated, one field in said record being said timestamp.

9. The method of claim 1, further including repeating said reviewing each time a garbage collection is executed.

10. A method for measuring the lifetime of objects in a garbage-collected system, the objects organized in a graph structure, the method including:
    recording a timestamp for an object when said reference count for said object is decremented;
    executing a garbage collection, said garbage collection indicating one or more objects which are cyclic garbage;
    reviewing in reverse chronological order said timestamps for each of said objects, and for each timestamp found:
    if said object is cyclic garbage:
        indicating that the object corresponding to said timestamp is dead; and
        indicating that any object reachable from said object corresponding to said timestamp is dead.

11. The method of claim 10, wherein said timestamp is a counter which is incremented on every pointer deletion.

12. The method of claim 10, wherein the lifetime of an object is the period between the time it is created and the time it dies.

13. The method of claim 12, wherein the time an object dies can be traced to the timestamp of when it was indicated the object was dead.

14. The method of claim 10, wherein each time a change is made to the graph structure, a record is generated, one field in said record being said timestamp.

15. The method of claim 10, further including repeating said reviewing each time a garbage collection is executed.

16. The method of claim 10, wherein said executing includes detecting objects which are cyclic garbage by invoking a tracing collector.

17. The method of claim 16, wherein said tracing collector is a mark-sweep collector.

18. An apparatus for measuring the lifetime of objects in a garbage-collected system, the objects organized in a graph structure, the apparatus including:
    means for maintaining a reference count for one or more of the objects, said reference count indicating the number of incoming pointers to each object;
    means for recording a timestamp for an object when said reference count for said object changes;
    means for reviewing in reverse chronological order said timestamps for each of said objects which are cyclic garbage, and for each timestamp found:
        indicating that the object corresponding to said timestamp is dead; and
        indicating that any object reachable from said object corresponding to said timestamp is dead.

19. The apparatus of claim 18, further including means for executing a garbage collection, said garbage collection indicating one or more objects which are cyclic garbage.

20. The apparatus of claim 19, wherein said executing includes detecting objects which are cyclic garbage by invoking a tracing collector.

21. The apparatus of claim 20, wherein said tracing collector is a mark-sweep collector.

22. The apparatus of claim 18, wherein said timestamp is a counter which is incremented on a pointer store.

23. The apparatus of claim 18, wherein the lifetime of an object is the period between the time it is created and the time it dies.

24. The apparatus of claim 23, wherein the time an object dies can be traced to the timestamp of when it was indicated the object was dead.

25. The apparatus of claim 18, wherein each time a change is made to the graph structure, a record is generated, one field in said record being said timestamp.

26. The apparatus of claim 18, further including means for repeating said reviewing each time a garbage collection is executed.

27. An apparatus for measuring the lifetime of objects in a garbage-collected system, the objects organized in a graph structure, the apparatus including:
    means for recording a timestamp for an object when said reference count for said object is decremented;
    means for executing a garbage collection, said garbage collection indicating one or more objects which are cyclic garbage;
    means for reviewing in reverse chronological order said timestamps for each of said objects, and for each timestamp found:
    if said object is cyclic garbage:
        indicating that the object corresponding to said timestamp is dead; and
        indicating that any object reachable from said object corresponding to said timestamp is dead.

28. The apparatus of claim 27, wherein said timestamp is a counter which is incremented on every pointer deletion.

29. The apparatus of claim 27, wherein the lifetime of an object is the period between the time it is created and the time it dies.

30. The apparatus of claim 29, wherein the time an object dies can be traced to the timestamp of when it was indicated the object was dead.

31. The apparatus of claim 27, wherein each time a change is made to the graph structure, a record is generated, one field in said record being said timestamp.

32. The apparatus of claim 27, further including means for repeating said reviewing each time a garbage collection is executed.

33. The apparatus of claim 27, wherein said means for executing includes means for detecting objects which are cyclic garbage by invoking a tracing collector.

34. The apparatus of claim 33, wherein said tracing collector is a mark-sweep collector.

35. A program storage device readable by a machine, tangibly embodying a program of instructions executable by the machine to perform a method for measuring the lifetime of objects in a garbage-collected system, the objects organized in a graph structure, the method including:

maintaining a reference count for one or more of the objects, said reference count indicating the number of incoming pointers to each object;

recording a timestamp for an object when said reference count for said object changes;

reviewing in reverse chronological order said timestamps for each of said objects which are cyclic garbage, and for each timestamp found:

indicating that the object corresponding to said timestamp is dead; and indicating that any object reachable from said object corresponding to said timestamp is dead.

36. A program storage device readable by a machine, tangibly embodying a program of instructions executable by the machine to perform a method for measuring the lifetime of objects in a garbage-collected system, the objects organized in a graph structure, the method including:

recording a timestamp for an object when said reference count for said object is decremented;

executing a garbage collection, said garbage collection indicating one or more objects which are cyclic reviewing in reverse chronological order said timestamps for each of said objects, and for each timestamp found:

if said object is cyclic garbage:

indicating that the object corresponding to said timestamp is dead; and indicating that any object reachable from said object corresponding to said timestamp is dead.

\* \* \* \* \*

UNITED STATES PATENT AND TRADEMARK OFFICE
CERTIFICATE OF CORRECTION

| | |
|---|---|
| PATENT NO. | : 7,376,683 B1 |
| APPLICATION NO. | : 10/796539 |
| DATED | : May 20, 2008 |
| INVENTOR(S) | : Mario Wolczko and Antonio Cunei |

It is certified that error appears in the above-identified patent and that said Letters Patent is hereby corrected as shown below:

Title Page;

On the coversheet, at Item 75, replace "Glasgow (IT)" with --Glasgow (GB)--.

In Column 10, Claim 36, Line 13, after "which are cyclic", insert --garbage;--.

Signed and Sealed this

Seventh Day of October, 2008

JON W. DUDAS
*Director of the United States Patent and Trademark Office*